(12) United States Patent
Renirie et al.

(10) Patent No.: US 7,864,904 B2
(45) Date of Patent: Jan. 4, 2011

(54) METHOD AND DATA PROCESSING DEVICE FOR PROCESSING DIGITAL DATA OF A SIGNAL

(75) Inventors: Wim Renirie, Beuningen (NL); Hans Stoorvogel, Malden (NL)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1094 days.

(21) Appl. No.: 11/134,995

(22) Filed: May 23, 2005

(65) Prior Publication Data

US 2005/0271172 A1 Dec. 8, 2005

(30) Foreign Application Priority Data

May 21, 2004 (DE) .................. 10 2004 025 472

(51) Int. Cl.
H04L 1/00 (2006.01)
(52) U.S. Cl. .................. 375/350; 375/316; 375/346; 455/296; 455/501; 327/551
(58) Field of Classification Search .......... 375/316, 375/346, 350; 455/296; 327/551
See application file for complete search history.

(56) References Cited

U.S. PATENT DOCUMENTS

| | | | | |
|---|---|---|---|---|
| 5,630,227 | A * | 5/1997 | Bella et al. | 455/324 |
| 6,424,683 | B1 * | 7/2002 | Schollhorn | 375/332 |
| 6,496,546 | B1 | 12/2002 | Allpress et al. | |
| 6,895,232 | B2 | 5/2005 | Parker | |
| 7,466,777 | B2 | 12/2008 | Muhammad et al. | |
| 2002/0008788 | A1 | 1/2002 | Talmola et al. | 348/732 |
| 2002/0051503 | A1 * | 5/2002 | Takahiko | 375/327 |
| 2002/0163981 | A1 | 11/2002 | Troemel, Jr. | 375/345 |
| 2003/0157910 | A1 | 8/2003 | Bruckmann et al. | |
| 2003/0171100 | A1 * | 9/2003 | Petersson et al. | 455/141 |
| 2004/0042563 | A1 * | 3/2004 | Najarian et al. | 375/316 |
| 2008/0318538 | A1 | 12/2008 | Suominen | |

FOREIGN PATENT DOCUMENTS

| | | | |
|---|---|---|---|
| EP | 0696 854 | 2/1996 | |
| EP | 1 098 484 | 5/2001 | ............ 27/26 |
| KR | 2000-0045148 | 7/2000 | ............ 7/12 |
| WO | WO 99/53660 | 10/1999 | |
| WO | WO 0106768 | 1/2001 | ............ 5/44 |
| WO | WO 02/089312 | 8/2001 | |

OTHER PUBLICATIONS

Tietze et al. "Semiconductor Circuit Engineering", Tenth Edition, Springer-Verlag Berlin Heidelberg New York, pp. 792-799 (1993).
Alfred Fettweis "Elements of Communications Systems", B.G. Teubner Stuttgart, pp. 162-165 (1990).
Tietze et al. "Halbleiter-Schaltungstechnick", Zehnte Auflage, Springer-Verlag Berlin Heidelberg New York, pp. 792-799 (1993).
Alfred Fettweis "Elemente nachrichtentechnischer Systeme", B.G. Teubner Stuttgart, pp. 162-165 (1990).

* cited by examiner

*Primary Examiner*—David C Payne
*Assistant Examiner*—Leon Flores
(74) *Attorney, Agent, or Firm*—DLA Piper LLP (US)

(57) ABSTRACT

The invention relates to a method for processing of a signal (s), wherein desired data (d(f(N))) are received via a desired channel (N) of a plurality of frequency channels (N−2, N−1, N, N+1, N+2) and unwanted data (d(f(N−2)), d(f(N−1)), d(f(N+1)), d(f(N+2))) can be received on a neighboring channel (N−2, N−1, N+1, N+2) and wherein the signal (s) is sampled with a sampling frequency (fa) to avoid aliasing of the desired channel (N) in order to create digital data (d°), wherein the sampling frequency (fa=2f(N−1, N, N+1)) is set high enough for aliasing-free sampling of the desired channel (N) and at least one of the neighboring channels (N−1, N+1).

11 Claims, 3 Drawing Sheets

METHOD AND DATA PROCESSING DEVICE FOR PROCESSING DIGITAL DATA OF A SIGNAL

PRIORITY INFORMATION

This application claims priority from German application 10 2004 025 472.9 filed May 21, 2004, which is hereby incorporated by reference.

BACKGROUND OF THE INVENTION

In broadcasting environments and other radio systems, analog signals are transmitted across a radio interface, and the transmission of data occurs on individually assigned frequency channels. Due to the use of neighboring channels, strong interference can arise. This is especially true of land-based systems, in which the existing or future network planning tolerates neighboring channels on which the transmission is 35 dB stronger than in the desired channel. Neighboring analog channels usually result in frequency-selective interference in the desired channel. In most digital radio technologies, functions can be implemented in a channel simulator to detect such frequency-selective interference to improve the error correction possibilities. In situations where the neighboring channel is a digital channel, relying on the continual introduction of new digital multiplex technologies, it is increasingly more likely in the future that the interference will be in the nature of a Gaussian interference, i.e., an interference which can no longer be reduced by the aforesaid channel simulator technologies.

FIG. 3 illustrates a typical implementation of a receiver for broadcast signals. A high-frequency (HF) signal s is received on a line 10, and input to a low noise amplifier (LNA) 10. The amplified signal is input to a tracking filter 14, whose output signal is provided to a mixer 16. An oscillator 18 provides an oscillator output signal to the tracking filter 14 and the mixer 16. The resultant mixed signal output by the mixer 16 is input to a sawtooth filter 20, SAW, whose output signal is provided to an amplifier 22. The amplifier 22 provides an intermediate frequency signal IF on a line 24. This first subassembly from the interface to the amplifier 22 constitutes a known tuner 26. The intermediate frequency signal IF on the line 24 is input to a subsequent assembly for further processing, which is usually a demodulator 28. The intermediate frequency signal IF is presented to an analog/digital converter (ADC), 30, which converts the analog intermediate frequency signal IF on the line 24 into a digital signal on a line 32. The digital data on the line 32 is input to a digital signal processing (DSP) unit 34 which usually includes, in particular, a digital demodulation system.

Known solutions for improving the capability with regard to neighboring channels that are implemented in such arrangements can be divided into three categories.

According to the first principle, the linearity of the input stage of the tuner 26 is improved. When strong signals are present, the combined power of all these channels is taken to the amplifier stage, i.e., the low noise amplifier 12, of the tuner. This low noise amplifier 12 is usually optimized for high linearity. A receiver is known from U.S. 2002008788 in which a bias current of the high-frequency amplifier is used to increase the linearity when signals from neighboring channels are present. Thus, there are possibilities for reducing the current when no neighboring interference signals are present. High linearity of the low noise amplifier 12 prevents saturation of this stage. However, the interfering signal is not removed and the remaining portion of the system must still deal with the high interference signals.

The second principle consists of performing an additional filtering in the analog region in order to further suppress the signal components of the unwanted channel prior to the sampling in the digital region. This principle is usually employed in situations in which reception with high capability is desired, wherein the further filtering is done behind the downstream converting stage, i.e., behind the mixer 6. However, the addition of a corresponding SAW filter 20 in the analog region is very expensive. Because of the necessary steep damping curve, sawtooth filters (SAW) are used. Because of the physical dimensions, one cannot expect the price of these filters to drop significantly in the future. Furthermore, these filters produce a heavy attenuation of the desired signal, which requires a compensation by an additional amplification with the amplifier 22.

The third principle consists of tuning the tuner frequency in order to shift the unwanted interference signals as much as possible outside of the visible region of the demodulator circuit 28, which further processes the incoming signal. This accomplishes a rather large attenuation of the signal of the unwanted neighboring channel by the available filters in the system, as is known from WO 0106768. However, shifting of the tuner frequency is helpful only in situations where a single neighboring interference signal exists. Moreover, the possible shifting range is limited, or else the signal of the desired channel would also be damped by the filters in the system.

EP 1384314 teaches a frequency conversion by undersampling, involving a two-phase sampling system for reduced frequency and power requirements in regard to the amplifier and the analog/digital converter. TW 484315 teaches a television receiver for digital signals with offset tuning capabilities, in which the tuner frequency is shifted when a neighboring channel is present, and corresponding information is obtained from a channel list. KR 2000045148 teaches a device for reducing interference from a neighboring channel in a digital television receiver.

There is a need for a system and method of processing the data of a signal in order to reduce unwanted data from a neighboring channel.

SUMMARY OF THE INVENTION

A signal in which desired data are received via a desired channel from a plurality of frequency channels and unwanted data can be received on a neighboring channel and wherein the signal is sampled with a sampling frequency which prevents aliasing of the desired channel to produce digital data, the sampling frequency being set high enough for the sampling of the desired channel and at least one of the neighboring channels to prevent aliasing.

A data processing device is preferred for the processing of a signal, especially an analog signal, with an interface for entering the signal, wherein desired data are received via a desired channel from a plurality of frequency channels and unwanted data can be received on a neighboring channel, and with a sampling device for sampling the signal to produce digital data with a sampling frequency preventing aliasing of the desired channel, wherein the sampling device is designed with a sampling frequency for sampling that prevents aliasing of the desired channel and at least one neighboring channel.

A method and data processing device of the present inventions enables aliasing-free sampling of interference signal components of a neighboring channel, so that these unwanted signal components or data can be filtered out in a subsequent process step. Ideally, steps for reducing unwanted data or signal components of neighboring channels can be eliminated or significantly reduced in the analog receiver stage. By "neighboring channels" or "unwanted channels" is meant not only the channels of the actual broadcasting system, but also signal components of a foreign communication system broadcasting on a neighboring frequency. The term "channel" is interpreted broadly and includes, depending on the communication or broadcasting system, an individual discrete frequency or, in a conventional manner, a frequency band with a system-dependent channel bandwidth of the desired channel and the neighboring channels.

In particular, a method is preferred in which the signal is received via a radio interface of a broadcasting system.

In particular, a method is preferred in which the digital data are filtered in order to reduce or filter out the unwanted data in order to provide filtered digital data with the desired data.

In particular, a method is preferred in which the sampling frequency is set high enough for aliasing-free sampling of the data of the desired channel and the data of the next-higher-frequency neighboring channel.

In particular, a method is preferred in which the sampling frequency is set high enough for the aliasing-free sampling of the desired channel and several neighboring channels, in particular, at least two of them with higher frequency.

In particular, a method is preferred in which the sampling frequency of the signal is set at more than twice the channel bandwidth of the desired channel for the aliasing-free sampling of higher frequency neighboring signal components. In particular, it is preferred in such a method for the sampling frequency to be set as a function of the number of neighboring channels considered in the reduction. In particular, it is preferred in such a method for the sampling frequency to be set twice as high per the neighboring channel in question.

In particular, a method is preferred in which a direct sampling scenario is used for the processing of the signal or data.

In particular, a method is preferred in which an undersampled scenario is used for the processing of the signal or data.

In particular, a data processing device is preferred in which the sampling device is operated with a sampling frequency for aliasing-free sampling of the desired channel and at least one higher-frequency neighboring channel.

In particular, a data processing device is preferred as part of a broadcasting receiver with a filter mechanism for reducing unwanted data, wherein the filter mechanism is designed to filter the digital data to reduce the unwanted data.

Thus, a simple tuner with a limited filter counteracting alias effects in the analog region or a tuner without such an analog filter is advantageous.

In particular, in view of the availability of analog/digital converters with precise sampling at high frequencies, it becomes possible to increase the sampling rate. Instead of sampling the signal at a rate of twice the channel bandwidth, sampling at more than twice the channel bandwidth is proposed. For example, with fourfold channel bandwidth of a digital television system, it is assured that aliasing effects of the direct neighboring channels will not affect the desired channel detrimentally by reflecting data into it. The result can be improved by a subsequent filtering, during which the data components of the neighboring channels are filtered out. If not just the directly neighboring channels, but also channels neighboring them are being filtered, the sampling rate can be increased to, say, six times the channel bandwidth, to reduce the aliasing effect. Subsequent suppression or filtering of the unwanted signal components prior to demodulation of the received signal can be done in the digital domain with high-attenuation digital filters with much lower cost and much higher efficiency than in the analog domain. With the technique described, there is the possibility of selecting a directly sampling scenario or an undersampling scenario for the sampling of the signals with higher intermediate frequencies. For example, if a sampling rate with six times the channel bandwidth is used, the specifications for the filter of the tuner are much lower. This enables development of tuners with low cost and offers great benefits to the tuner manufacturers, who would like to implement the same tuner functionality in a silicon element.

An application is possible in all receivers and receiver functions when the receiving and the processing of data is affected by strong signals in neighboring channels. This applies in particular to receivers for digital terrestrial TV such as DVB-T, ISDB-T, and 8VSB, but also other types of receivers. Broadband sampling for prevention of aliasing in the desired signal can also be used to advantage in them.

These and other objects, features and advantages of the present invention will become more apparent in light of the following detailed description of preferred embodiments thereof, as illustrated in the accompanying drawings.

DESCRIPTION OF THE INVENTION

Figure 1:
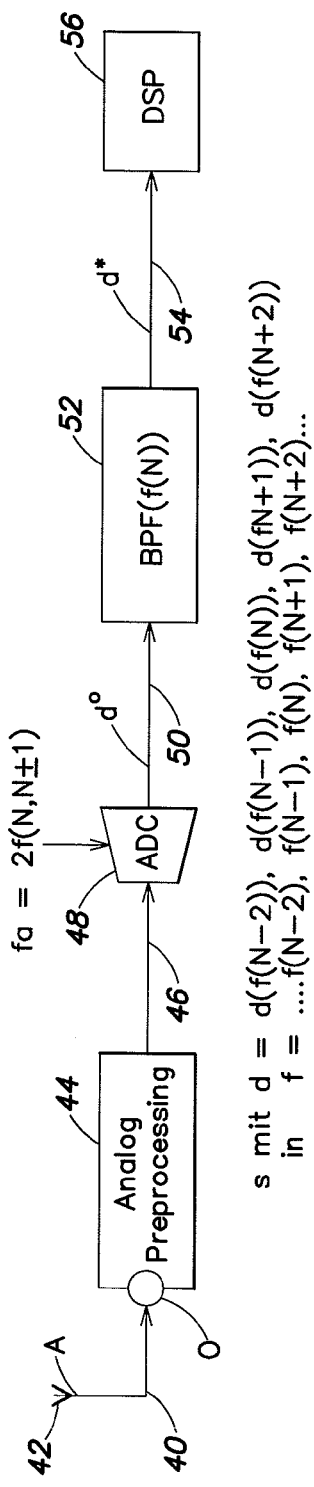
FIG. 1 illustrates a data processing device for processing an analog signal with reduction of unwanted data of a channel neighboring the desired channel.

FIG. 1 illustrates a data processing device for processing a input signal received on a line 40. The signal is received, for example, by an antenna 42. The input signal comprises data d. The data being transmitted are each coordinated with a frequency channel N of a plurality of available frequency channels . . . , N−2, N−1, N, N+1, N+2, . . . . A particular frequency or a particular frequency band . . . , f(N−2), f(N−1), f(N), f(N+1), f(N+2), . . . is assigned to each of these channels.

Figure 3:
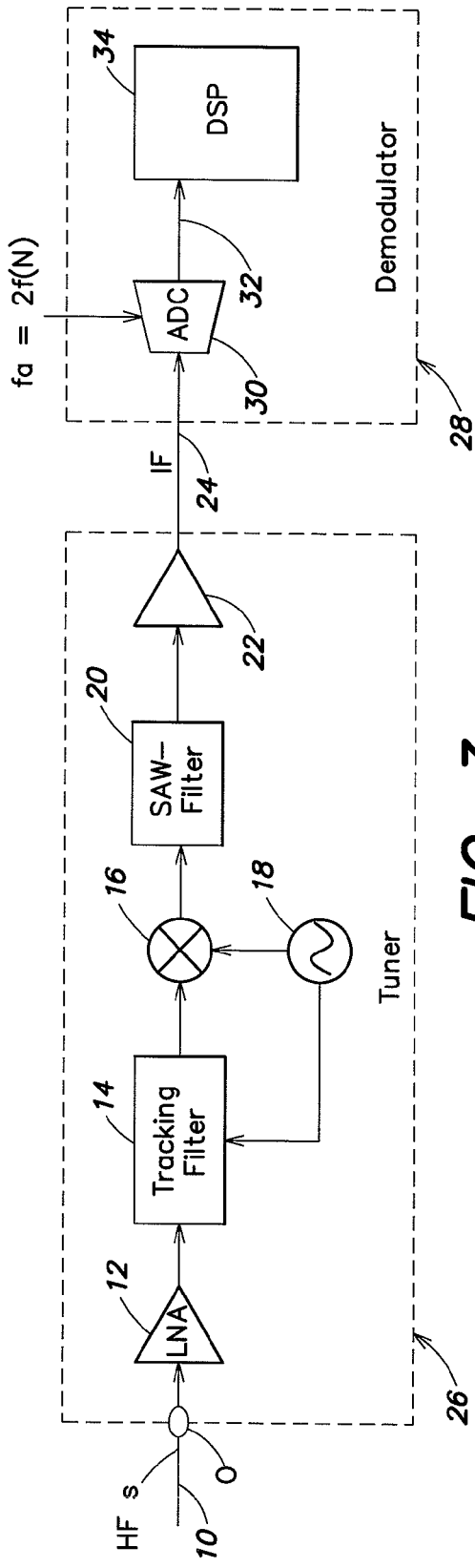
FIG. 3 illustrates a prior art data processing device.

The received analog signal on the line 40 is input to a first data processing device 44 for analog preprocessing. The analog preprocessing involves, for example, known data processing, as described with reference to FIG. 3. Advantageously, however, certain of the analog preprocessing steps can be omitted, which reduces the signal components or data received as part of an unwanted frequency band f(N−2), f(N−1), f(N+1), f(N+2) or an unwanted channel. The analog preprocessing 44 may include a low noise amplifier 12, a tracking filter 14, a mixer 16, an oscillator 18, possibly a SAW filter 20, and an amplifier 22, which output an intermediate frequency signal on the line 44.

This intermediate frequency signal on the line 24 is input an analog-to-digital converter (ADC) 48, which samples the intermediate frequency signal on the line 46 with a sampling frequency fa and outputs digital data $d^o$ on a line 50. The sampling occurs with a sampling frequency fa that is greater than a sampling frequency required to digitize the desired channel N from the plurality of frequency channels N−2, N−1, N, N+1, N+2. The sampling frequency fa is chosen high enough to also enable sampling of neighboring channels, especially the higher-frequency neighboring channel N+1, while avoiding aliasing. Thus, the sampling frequency fa corresponds to fa=2f(N, N±1), or the maximum value of twice the frequency of this frequency range. The resultant digital data d° on the line 50 offer the advantage, in particular, that the data components d(f(N)) of the desired channel N are free from data components of neighboring channels reflected in by aliasing effects.

The digital data d° on the line 50 are input to a filter 52, which is configured as a bandpass filter BPF(f(N)) to let through components of frequency or of frequency band f(N) of the desired channel N. The filter 9 is an easily realized digital filter, which outputs filtered digital data on a line 54 for further data processing, for example, to a digital signal processing device (DSP), 56. This digital signal processing device 56 includes, for example, the functions of a demodulator. It is also possible to integrate the filter 52 together with this and additional processing steps in such a digital signal processing device 56.

FIGS. 2A-2E illustrate the processing of the received analog signal on the line 40. FIGS. 2A-2E are plots against frequency f of the strength of the signal components of five neighboring channels N−2, N−1, N, N+1, N+2, for example, as a function of frequency. Damping by filters is indicated, for example, by decibels dB in certain of the diagrams. The individual diagrams show, from top to bottom, signal states of various processing steps in time sequence. In particular, the first three processing steps shown can be optionally omitted, however, when the input signal is taken directly to the ADC 48.

Figure 2A:
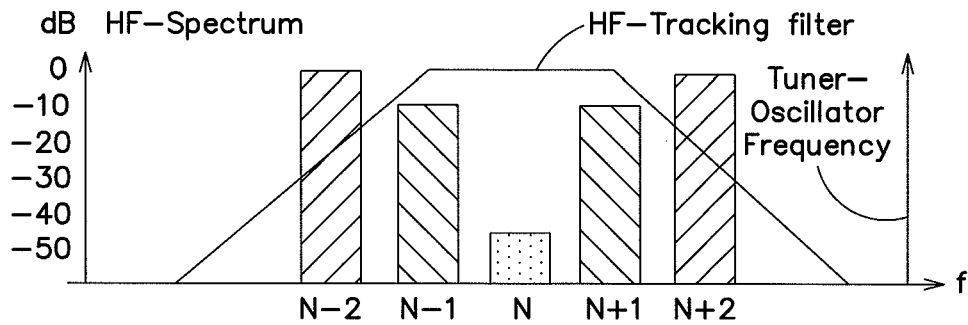
FIG. 2 (2A-2E) is a frequency diagram to illustrate a flowchart for filtering out unwanted data from a channel neighboring a desired channel.
Figure 2B:
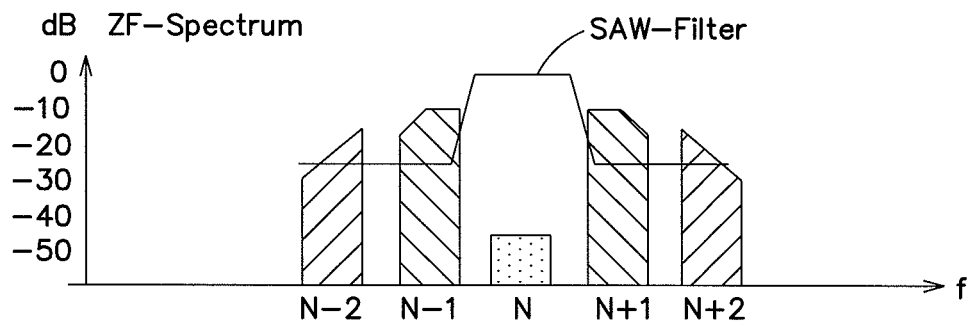
Figure 2C:
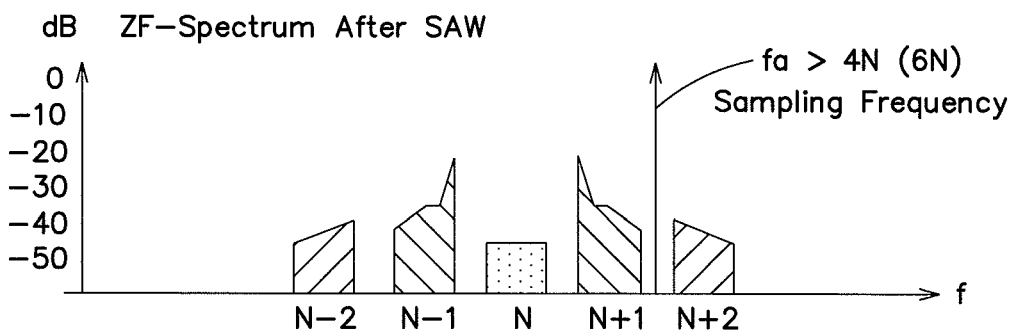

FIG. 2A illustrates a central desired channel N, whose assigned bandwidth is a frequency range about a central frequency f(N). On this channel N, as a desired channel N, desired data d(f(N)) are received. Neighboring this desired channel N are additional channels N−2, N−1, N+1, N+2, which are unwanted channels with unwanted data d(f(N−2)), d(f(N−1)), d(f(N+1)) and d(f(N+2)). These unwanted data, as an additional detriment, have a much higher strength than the desired data d(f(N)), so that they greatly impair the reception of the desired data d(f(N)). Preferably a high-frequency tracking filter is used for the received signal with these channels N−2, . . . , N+2. In this case, a tuner oscillator frequency is used that is much higher than the frequency of the unwanted channels N−2, N−1, N+1, N+2 and the desired channel N. In a subsequent processing step, a filter (e.g., a SAW filter) is used, which further reduces the strength of the unwanted data on the unwanted channels N−2, N−1, N+1, N+2. FIG. 2C illustrates the intermediate frequency spectrum obtained in this way.

Following preprocessing, the signal on the line 46 is digitized using a sampling frequency fa.

Figure 2D:
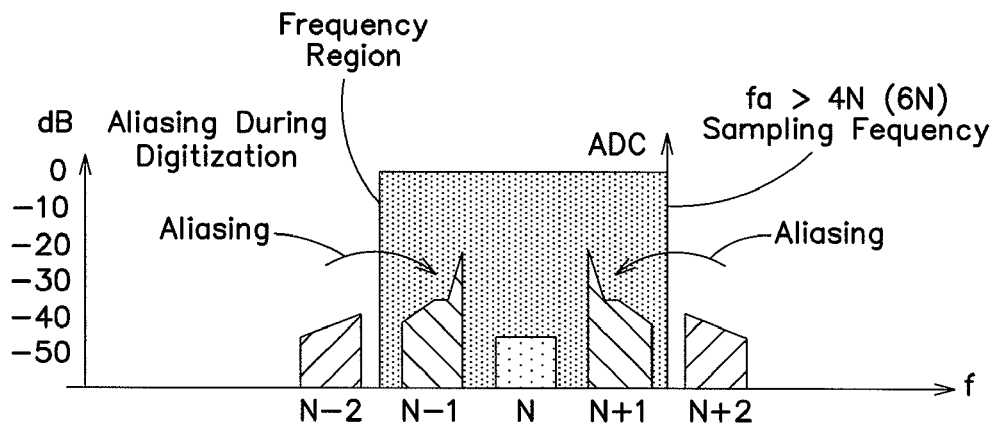
Figure 2E:
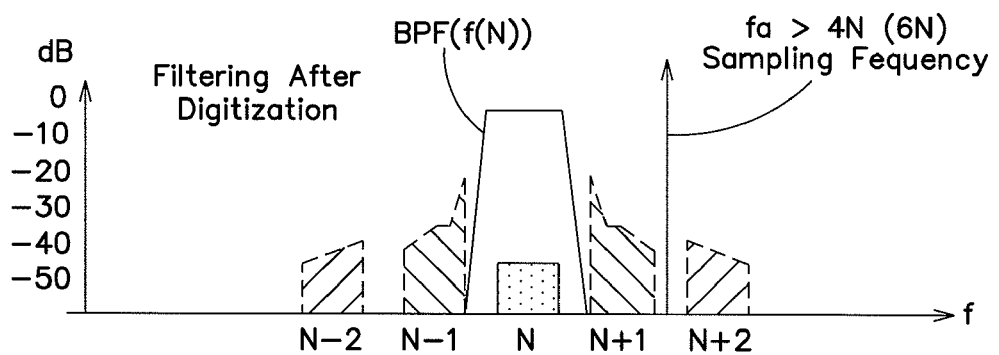

As illustrated in FIG. 2D, the sampling frequency fa is chosen large enough that the desired channel N is digitized without negative influence from aliasing effects. Furthermore, the sampling frequency fa is set large enough so that the neighboring unwanted channels N−1, N+1 are also sampled while avoiding aliasing. The sampling frequency fa is chosen to be twice the frequency of the higher-frequency unwanted channel N+1. Preferably, the sampling frequency is set somewhat higher than the upper frequency of the channel bandwidth of the higher-frequency neighboring channel N+1, so that fa>4N or fa>2f(N+1). Such digitization has the result that aliasing effects from the next particular neighboring channels N−2, N+2 only affect the neighboring channels N−1 and N+1. If this also needs to be precluded, the sampling frequency fa can be set larger than six times the channel bandwidth N or more than six times the highest frequency f(N+2) of the channel bandwidth of the next-higher-frequency neighboring channel N+2 of the desired channel N.

Thus, for the further digital signal processing a sequence of digital data d° on the line 50 is available, in which the data or the data components d(f(N)) of the desired channel N have no detrimental aliasing effects or reduced effects. To further improve the subsequent digital signal processing or to convert back to an analog signal, the digital data d° on the line 50 are preferably filtered. A preferred filter is the bandpass filter BPF(f(N)) 52 with a pass region corresponding to the channel bandwidth f(N) of the desired channel N. In this way, data components or, in the case of analog signal preprocessing, the remaining data components d(f(N−2)), d(f(N−1)), d(f(N+1)), and d(f(N+2)) of the unwanted channels N−2, N−1, N+1, N+2 are filtered out from the digital data d° on the line 50. The thus filtered digital data d* on the line 54 with ideally only the remaining data d(f(N)) of the desired channel N are then put out for further processing, in particular, taken to the digital signal processing (DSP) 56.

In theory, the principle can also be extended to a larger number of neighboring channels N+1, N+2, . . . , N+k, in which case the sampling frequency used for the digitization is set to correspond to two or more times the corresponding highest frequency f(N+k) of the highest frequency channel N+k being considered. In this procedure, lower-frequency neighboring channels N−1, N−2, . . . , N−k are preferably automatically factored in.

Although the present invention has been shown and described with repect to several preferred embodiments thereof, various changes, omissions and additions to the form and detail thereof, may be made therein, without departing from the spirit and scope of the invention.

What is claimed is:

1. A method performed in a television receiver for processing an input signal that includes desired data received via a desired channel of a plurality of frequency channels and unwanted received on a neighboring channel, the method performed in the television receiver comprising:

sampling the input signal with an adjustable sampling frequency wherein the sampling frequency is between two to six times the channel bandwidth of the desired channel to provide digital data;

band-pass filtering the digital data with a band-pass filter having a pass-band corresponding to the channel width of the desired channel to provide a band-pass filtered signal; and demodulating the band-pass filtered signal;

wherein the adjustable sampling frequency is set to filter unwanted data prior to demodulation of the desired data in the digital domain with a high-attenuation digital band-pass filter;

wherein the adjustable sampling frequency is set high enough for aliasing-free sampling of the data of the desired channel and the data of the higher-frequency neighboring channel; and wherein the sampling frequency is set high enough for aliasing-free sampling of the desired channel and several higher-frequency neighboring channels especially at least two such channels.

2. The method of claim 1, wherein the input signal is received via a radio interface.

3. A method performed in a television receiver for processing an input that includes desired data received via a desired channel of a plurality of frequency channels and unwanted data received on a neighboring channel, the method performed in the television receiver comprising:

sampling the input signal with an adjustable sampling frequency wherein the sampling frequency is between two to six times the channel bandwidth of the desired channel to provide digital data;

band-pass filtering the digital data with a band-pass filter having a pass-band corresponding to the channel width of the desired channel to provide a band-pass filtered signal;

demodulating the band-pass filtered signal;

wherein the adjustable sampling frequency is set to filter unwanted data prior to demodulation of the desired data in the digital domain with a high-attenuation digital band-pass filter;

wherein the digital data are filtered to reduce the unwanted data in order to provide filtered digital data with the desired data; and wherein the adjustable sampling frequency is set high enough for aliasing-free sampling of the data of the desired channel and the data of the higher-frequency neighboring channel;

wherein the sampling frequency is set high enough for aliasing-free sampling of the desired channel and several higher-frequency neighboring channels especially at least two such channels.

4. The method of claim 3, wherein the sampling frequency of the signal(s) is set at more than twice the channel bandwidth of the desired channel for aliasing-free sampling.

5. The method of claim 3, wherein a direct sampling scenario is used for processing the signal (s) or the data.

6. The method of claim 3, wherein an undersampled scenario is used for processing the signal (s) or the data.

7. A data processing device that receives an analog input signal wherein desired data are received on a desired channel of a plurality of frequency channels and unwanted data can be received on a neighboring, the device comprising:

a sampling device for sampling the analog input signal to generate digital data with a adjustable sampling frequency avoiding aliasing of the desired channel, wherein the sampling device is operated with the adjustable sampling frequency between two to six times the channel bandwidth of the desired channel to provide digital data;

a high-attenuation digital band-pass filter having a passband that corresponds to the channel width of the desired channel, that is responsive to the digital data and provides a band-pass filtered signal;

wherein the adjustable sampling frequency is set to filter unwanted data prior to demodulation of the desired data in the digital domain with the high-attenuation digital band-pass filter; and means for processing and demodulating said band-pass filtered digital data to recover data within the desired channel;

wherein the sampling device is operated with the sampling frequency set for the aliasing-free sampling of the desired channel and at least one higher-frequency neighboring channel.

8. A method performed in a television receiver of processing an analog input signal, the method formed in the television receiver comprising:

receiving the analog input signal and preprocessing the analog input signal to provide an analog preprocessed signal;

sampling the analog preprocessed signal using an adjustable sampling frequency to provide a digitized signal wherein the adjustable sampling frequency is set to filter unwanted data prior to demodulation of the desired data in the digital domain with a high-attenuation digital band-pass filter;

band-pass filtering the digitized signal with a high-attenuation digital band-pass filter having a pass-band corresponding to the channel width of the desired channel-to provide a band-pass filtered signal wherein the adjustable sampling frequency is set to filter unwanted data prior to demodulation of the desired data in the digital domain set for the aliasing-free sampling of the desired channel and at least one higher-frequency neighboring channel; and demodulating the band-pass filtered signal;

wherein the filtered-digitized signal comprises a plurality of frequency channels.

9. The method of claim 8, wherein the sampling frequency of the signal(s) is set at more than twice the channel bandwidth of the desired channel for aliasing-free sampling.

10. The method of claim 9, wherein a direct sampling scenario is used for processing the signal (s) or the data.

11. The method of claim 9, wherein an undersampled scenario is used for processing the signal (s) or the data.

* * * * *